US010475243B2

(12) United States Patent
Marshall et al.

(10) Patent No.: US 10,475,243 B2
(45) Date of Patent: Nov. 12, 2019

(54) TRANSITION BETWEEN VIRTUAL REALITY AND REAL WORLD

(71) Applicant: Intel Corporation, Santa Clara, CA (US)

(72) Inventors: Carl S. Marshall, Portland, OR (US); Glen J. Anderson, Beaverton, OR (US); Selvakumar Panneer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,722

(22) Filed: Mar. 31, 2017

(65) Prior Publication Data

US 2018/0286080 A1 Oct. 4, 2018

(51) Int. Cl.
*G06T 19/00* (2011.01)
*G02B 27/01* (2006.01)

(52) U.S. Cl.
CPC .......... *G06T 19/006* (2013.01); *G02B 27/017* (2013.01); *G02B 2027/014* (2013.01); *G02B 2027/0118* (2013.01); *G02B 2027/0138* (2013.01)

(58) Field of Classification Search
CPC ...... G02B 2027/0118; G02B 2027/014; G02B 2027/0178; G02B 27/0093; G02B 27/01; G02B 27/017; G09G 2320/02; G09G 2320/0271; G09G 2340/00; G09G 2360/144; G09G 3/001; G09G 2320/06; H04N 13/344; H04N 13/398; H04N 2213/008
See application file for complete search history.

(56) References Cited

U.S. PATENT DOCUMENTS

2010/0177114 A1* 7/2010 Nakashima .......... G02B 27/017 345/589
2013/0336631 A1* 12/2013 Kura .................. G02B 27/0172 386/230
2015/0281827 A1* 10/2015 Burgett ................ H04R 1/1041 381/370
2015/0302659 A1* 10/2015 O'Connor ............... G06F 3/011 345/633
2017/0116950 A1* 4/2017 Onal .................... G09G 3/3696
2017/0307893 A1* 10/2017 Kooi .................. G02B 27/0172
2018/0190019 A1* 7/2018 Glynn ................... G06T 19/006

FOREIGN PATENT DOCUMENTS

WO WO-2012133379 A1 * 10/2012 ........... G02B 27/017

OTHER PUBLICATIONS

Official Translation PTO 133490 of WO 2012133379 A1 (Year: 2012).*

* cited by examiner

*Primary Examiner* — William A Beutel
(74) *Attorney, Agent, or Firm* — Schwegman Lundberg & Woessner, P.A.

(57) ABSTRACT

Various systems and methods for virtual reality transitions are described herein. A head-mounted display system for providing virtual reality transitions includes a virtual reality transition engine to detect a trigger event initiated by a user of the head-mounted display; a sensor array to determine a real-world environmental condition; and a graphics driver to present virtual reality content in a format based on the real-world environmental condition.

17 Claims, 7 Drawing Sheets

TRANSITION BETWEEN VIRTUAL REALITY AND REAL WORLD

TECHNICAL FIELD

Embodiments described herein generally relate to computing, and in particular, to systems and methods for mixed reality transitions.

BACKGROUND

Augmented reality (AR) viewing may be defined as a live view of a real-world environment whose elements are supplemented (e.g., augmented) by computer-generated sensory input such as sound, video, graphics, or GPS data. Virtual reality (VR) viewing may be defined as a fully simulated world, within which the viewer may interact. A head-mounted display (HMD), also sometimes referred to as a helmet-mounted display, is a device worn on the head or as part of a helmet that is able to project images in front of one or both eyes. An HMD may be used for various applications including AR or VR simulations. HMDs are used in a variety of fields such as military, gaming, sporting, engineering, and training

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Virtual reality (VR) makes a user feel completely immersed in an alternative environment, but one aspect of VR that has not been addressed is how to smoothly transition a user from the virtual world back to the real world. After a user's eyes dilate to a darker environment in the virtual world, her eyes have to adjust quickly when the VR headset is removed and she finds herself in a bright environment in the real world, which causes strain and squinting. In the opposite scenario, a user may remove the VR headset in a dark room where the display setting on the VR headset brightness was extremely high, causing temporary blindness until her eyes adjust to the dark real-world environment.

A mechanism to address these situations, and others, is to configure the VR system to map environmental lighting/darkness, and other environmental variables, in order to adjust the VR experience to match the position and intensity of the surrounding environment lights, sound levels, scheduled activities, and other real-life aspects, to smooth the transition from VR to real world. Alternatively, the VR system may adjust the environment to be consistent with the VR experience.

Today's VR HMDs do not have a smooth transition from the virtual world to the real world. Systems and methods described herein ease the user back into the real world when removing a VR HMD.

Figure 1:
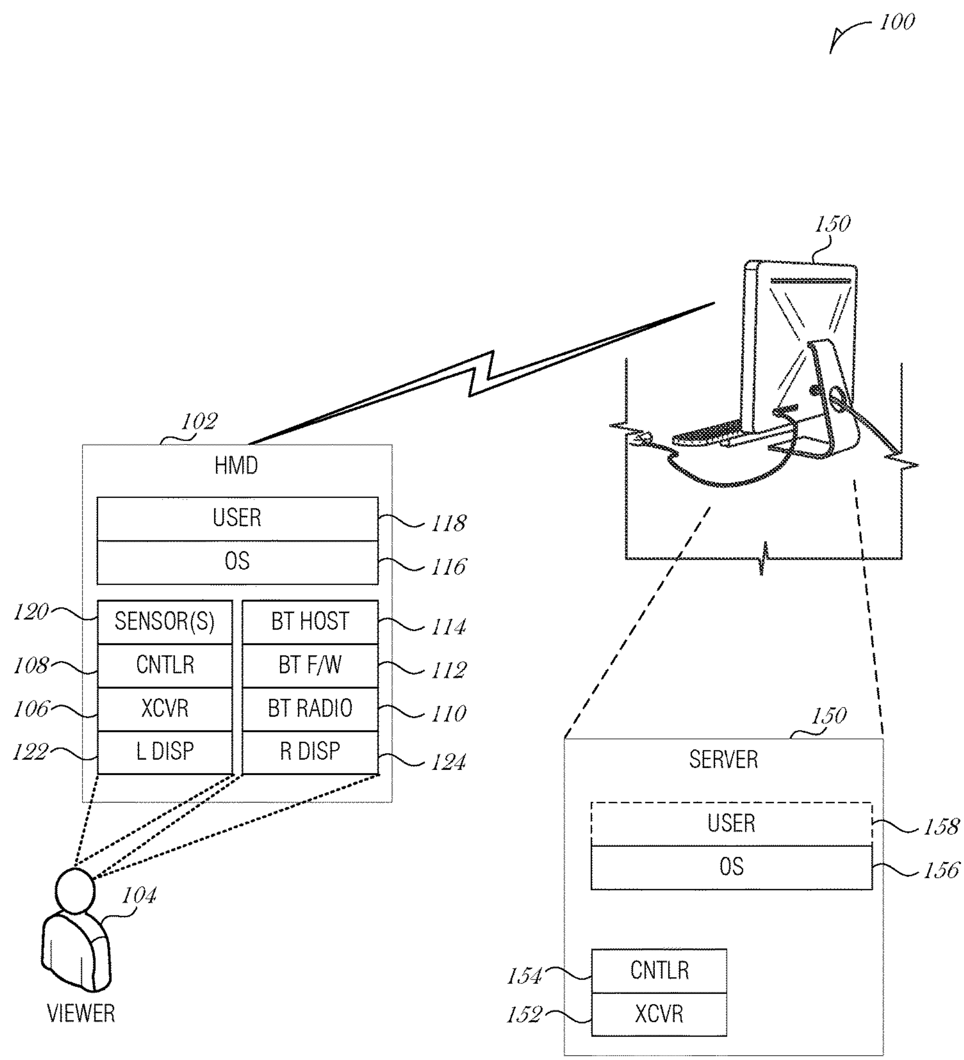
FIG. 1 is a block diagram illustrating a virtual reality (VR) system, according to an embodiment.

FIG. 1 is a block diagram illustrating a virtual reality (VR) system 100, according to an embodiment. The VR system 100 may include a head-mounted display 102 (HMD) and a server 150. The VR system 100 may be installed and executed at a local site, such as at an office or home, or installed and executed from a remote site, such as a data center or a cloud service. Portions of the VR system 100 may run locally while other portions may run remotely (with respect to the local elements). The HMD 102 may be communicatively coupled with the server 150 via a hardwired connection (e.g., DVI, DisplayPort, HDMI, VGA, Ethernet, USB, FireWire, AV cables, and the like), or via a wireless connection (e.g., Bluetooth, Wi-Fi, and the like).

The HMD 102 may include a transceiver 106, capable of both sending and receiving data, and be controlled by a controller 108. The transceiver 106 and controller 108 may be used to communicate over various wireless networks, such as a Wi-Fi network (e.g., according to the IEEE 802.11 family of standards); cellular network, for example, a network designed according to the Long-Term Evolution (LTE), LTE-Advanced, 5G, or Global System for Mobile Communications (GSM) families of standards; or the like.

The HMD 102 may include Bluetooth hardware, firmware, and software to enable Bluetooth connectivity according to the IEEE 802.15 family of standards. In an example, the HMD 102 includes a Bluetooth radio 110 controlled by Bluetooth firmware 112 and a Bluetooth host 114.

The HMD 102 may include a left display monitor 122 to display an image to a left eye of a viewer 104, and a right display monitor 124 to display an image to a right eye of the viewer 104. However, this should not be construed as limiting, as in some embodiments, the HMD 102 may include only one video display, which may display both an image associated with the left eye and an image associated with the right eye of the viewer, or may display a two-dimensional (2D) image on a set of display monitors.

The HMD 102 may also include a set of sensors 120. The sensors 120 may include a digital still camera or video camera to receive images of the environment adjacent to or surrounding the HMD 102 or within a line of sight of the HMD 102, e.g., the environment adjacent to or surrounding the viewer 104 or within a line of sight of the viewer 104 when the viewer 104 is using the HMD 102. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104. The displayed image may be modified to incorporate a representation of the image of the environment within a line of sight of the HMD 102.

The sensors 120 may also include a microphone to receive audio of the environment. The sensors 120 may also include a motion detector, e.g., an accelerometer, to detect movement of the HMD 102, e.g., movement of the viewer's head when the viewer 104 wears the HMD 102. The motion detector may also detect other movements of the viewer 104, e.g., the viewer 104 sitting down, standing up, or head turning.

The sensors 120 may also include a proximity sensor to detect proximity of the HMD 102 to people or objects in the real-world environment surrounding the HMD 102. The sensors 120 may also include one or more of temperature sensors, humidity sensors, light sensors, infrared (IR) sensors, heart rate monitors, vibration sensors, tactile sensors, conductance sensors, etc., to sense the viewer's activities and current state, accept input, and also to sense information about the viewer's environment.

An operating system 116 may interface with the controller 108 and Bluetooth host 114. The operating system 116 may be a desktop operating system, embedded operating system, real-time operating system, proprietary operating system, network operating system, and the like. Examples include, but are not limited to, Windows® NT (and its variants), Windows® Mobile, Windows® Embedded, Mac OS®, Apple iOS, Apple WatchOS®, UNIX, Android™, JavaOS, Symbian OS, Linux, and other suitable operating system platforms.

A communication controller (not shown) may be implemented in hardware, in firmware, or in the operating system 116. The communication controller may act as an interface with various hardware abstraction layer (HAL) interfaces, e.g., device drivers, communication protocol stacks, libraries, and the like. The communication controller is operable to receive user input (e.g., from a system event or by an express system call to the communication controller), and interact with lower-level communication devices (e.g., Bluetooth radio, Wi-Fi radio, cellular radio, etc.) based on the user input. The communication controller may be implemented, at least in part, in a user-level application that makes calls to one or more libraries, device interfaces, or the like in the operating system 116, to cause communication devices to operate in a certain manner.

A user application space 118 on the HMD 102 is used to implement user-level applications, controls, user interfaces, and the like, for the viewer 104 to control the HMD 102. An application, app, extension, control panel, or other user-level executable software program may be used to control access to the HMD 102. For example, an executable file, such as an app, may be installed on the HMD 102 and operable to communicate with a host application installed on the server 150. As another example, an application executing in user application space 118 (or OS 116) may work with the sensors 120 to detect gestures performed by the viewer 104.

The server 150 may include an operating system 156, a file system, database connectivity, radios, or other interfaces to provide a VR experience to the HMD 102. In particular, the server 150 may include, or be communicatively connected to, a radio transceiver 152 to communicate with the HMD 102. A respective controller 154 may control the radio transceiver 152 of the server 150, which in turn may be connected with and controlled via the operating system 156 and user-level applications 158.

In operation, the viewer 104 may interact with a VR environment using the HMD 102. When the viewer 104 is ready to exit the VR environment, the viewer 104 may perform some triggering action. The action may be a keyword the viewer 104 speaks, a trigger gesture that the viewer 104 performs, or a user interface (e.g., a button the HMD 102) that the viewer 104 presses. This is a non-limited list of actions and it is understood that additional actions, or combinations of actions, may be performed to indicate that the viewer 104 is ready to exit the VR environment. In response, the HMD 102 may begin displaying images to the viewer 104 to transition the viewer 104 from the VR environment to the real-world environment. The transition may be controlled by the HMD 102 or by the server 150.

Figure 2:
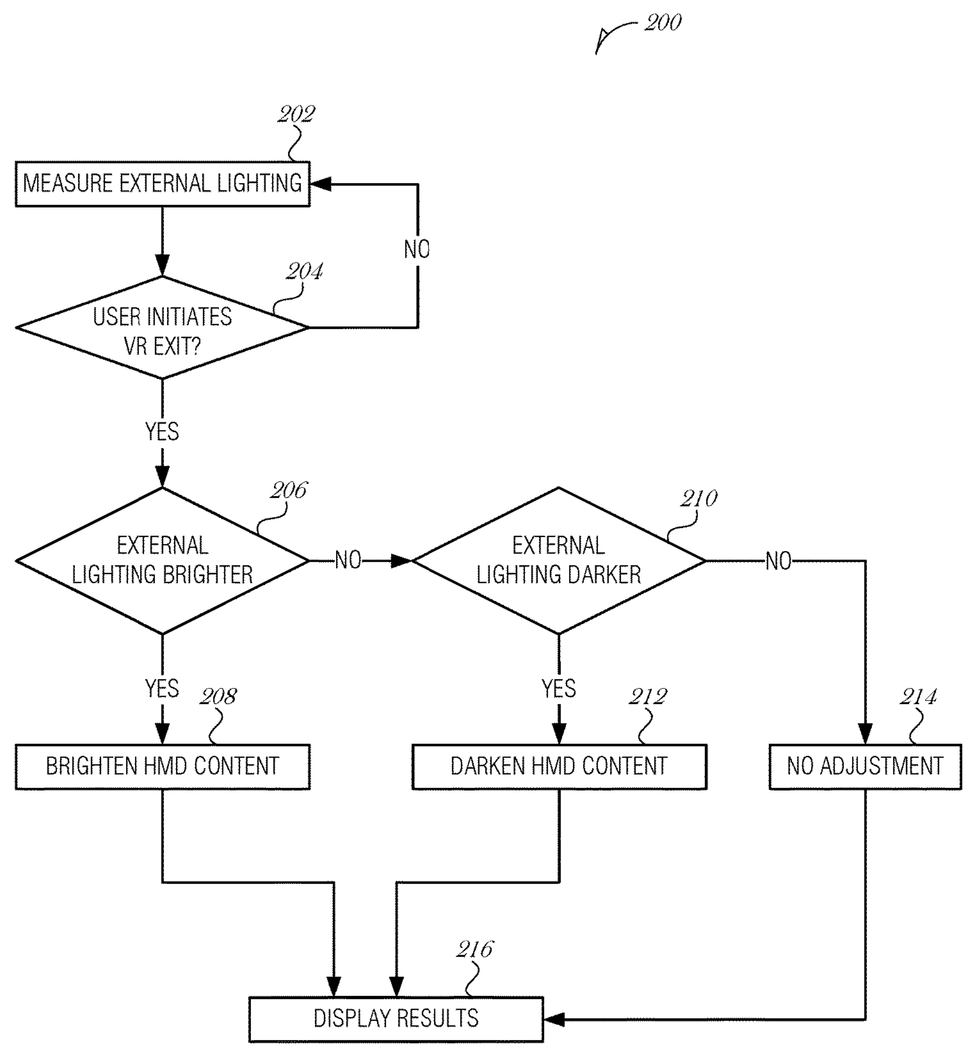
FIG. 2 is a flowchart illustrating a process for transitioning from a VR environment to a real-world environment, according to an embodiment.

FIG. 2 is a flowchart illustrating a process 200 for transitioning from a VR environment to a real-world environment, according to an embodiment. The external lighting is measured by a sensor array on the HMD. The lighting may be measured using one or more luminosity sensors, one or more cameras, one or more light meters, or the like to measure light intensity, direction, or color. Sensors may be disposed around the front or sides of the HMD. Additionally, the HMD may include a headband, helmet, or other support apparatus to position the HMD in place on the user's head. Sensors may be disposed on or around such support apparatus.

The user/wearer may initiate an exit from a virtual reality environment (operation 204). The user may initiate such an intent to exit using a voice command, gesture, user interface component, or the like. For instance, the user may press a button on the HMD to suspend the HMD operation and terminate a VR session.

The external lighting (e.g., real-world lighting) is compared to the displayed lighting in the VR environment. If the external lighting is brighter (operation 206), then the HMD content in the VR environment is transitioned to a brighter image (operation 208). The HMD content may be customized to mimic the external real-world environment's lighting characteristics (operation 216). For instance, if there is a bright lamp in a certain position of the user's field of view, then the HMD content may be modified to bring up a brighter spot in the relative positon of the lamp. In an example, the color of the external light, along with its position and intensity, is reproduced in the HMD content. Using this type of transition effect, the HMD prepares the user's eyes to the actual real-world environment so that when the user removes the HMD from their head, the user's eyes are already adjusted for the real-world ambient light. The user may avoid physical discomfort associated with flash blindness. Flash blindness is a temporary blindness caused by exposure to a bright flash of light that oversaturates the retina pigments.

If the external lighting is darker than the HMD content (operation 210), then the HMD content may be darkened (operation 212). This may avoid some complications with dark adaptation. Dark adaptation refers to the change in sensitivity of rods and cones in a human retina as each increases sensitivity to light in a dim environment. Cones are more sensitive to light, but take longer to adjust when going from a light environment to a dim environment. As such, darkening the HMD content (operation 212) helps to begin dark adaptation earlier before exiting the VR session. The darkened HMD content is displayed (operation 216).

It is understood that the brightening operation 208 or the darkening operation 212 may be repeated several times to slowly bring up the light intensity or bring down the light intensity, respectively. Thus, the process 200 may flow from operation 208 to operation 216 several times to lighten content over time. Alternatively, the process 200 may flow from operation 212 to operation 216 several times to darken content over time.

In an example, the user may initiate the VR exit (operation 204) relatively early to when they actually want to end the VR session. For example, the user may initiate VR exit ten minutes before exiting. During the ten-minute countdown, the scenes in the VR session may be adapted to slowly integrate the light composition of the user's real-world environment. The longer lead time may assist the user in adapting for certain lighting conditions. For instance, cones in the user's retina may take up two thirty minutes to fully adapt to a dim environment. By using a longer lead time, the cones are provided more time to adjust and the user will not exit the VR session being night blind.

If there is no lighting difference between the VR content and the real-world environment (operation 214), then the VR content is displayed without modification (operation 216).

While FIG. 2 discusses a VR environment, it is understood that an AR environment may be similarly adjusted for the user. For instance, in an AR environment, if an AR content element is blocking a bright light source (e.g., a ceiling light), before removing the AR content element, the visual properties of the AR content element may be adjusted to allow the user's eyes to adapt to the real-world lighting conditions. For instance, the AR content element may be displayed with progressively translucent values (e.g., fade away). As another example, the AR content may be modified with an increasingly bright spot drawn on the content.

Figure 3:
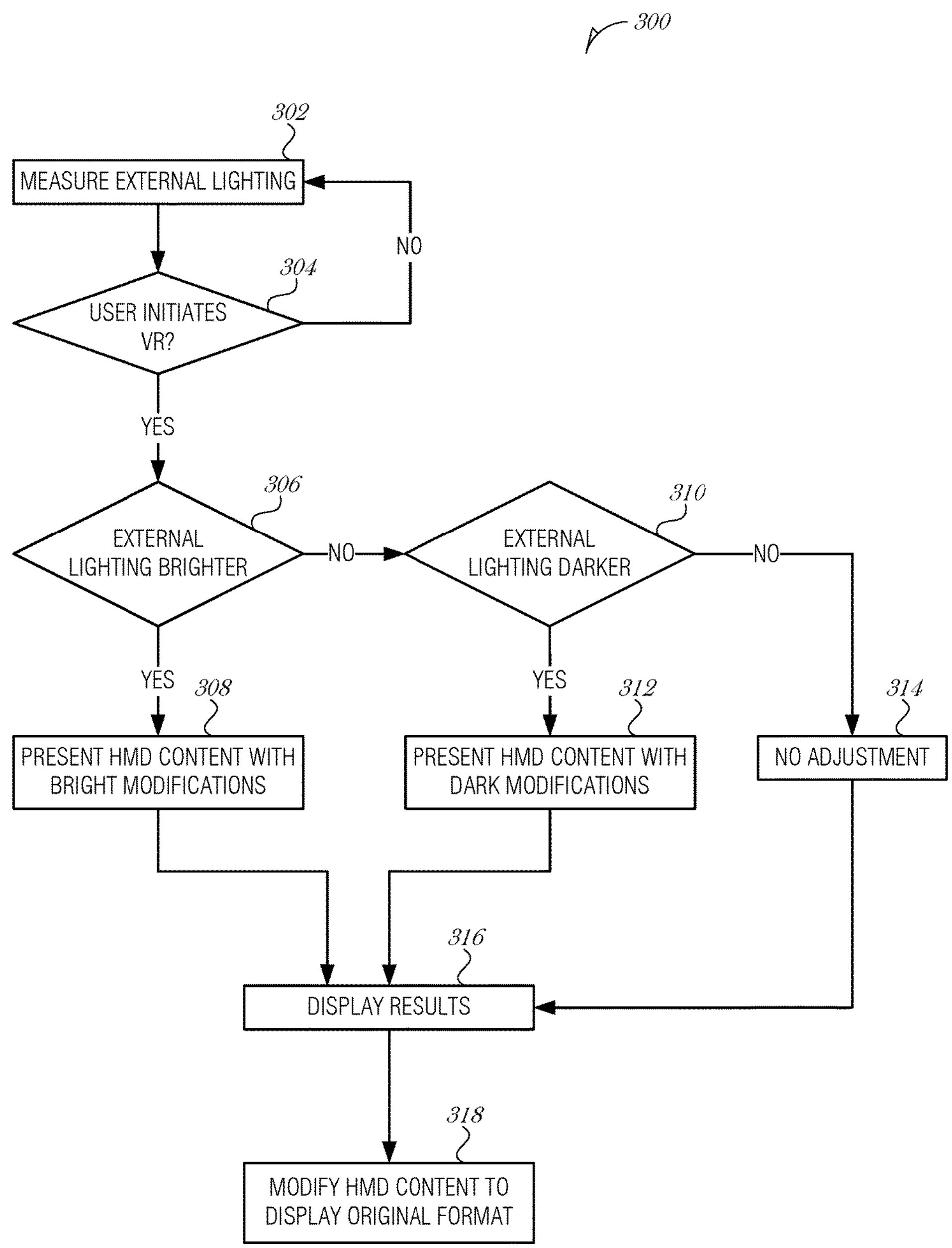
FIG. 3 is a flowchart illustrating a process for transitioning from real-world environment to a VR environment, according to an embodiment.

FIG. 3 is a flowchart illustrating a process 300 for transitioning from real-world environment to a VR environment, according to an embodiment. Similar to the functionality illustrated in FIG. 2, in FIG. 3 the HMD content is modified to assist the user as the user enters a VR session. At 302, the external lighting is measured. This may be performed as the user is placing the HMD on their head, for example. Alternatively, this measurement operation may be performed in response to when the user initiates a VR session (operation 304).

If the external lighting is brighter than the HMD content that will be displayed to the user (operation 306), then the HMD content is initially presented with a bright modification (operation 308). This modified HMD content is displayed (operation 316) and then further modified over time to eventually display the HMD content in its original format (operation 318). This process allows the user's eyes to adjust to a dark scene in the HMD content, allowing the user to avoid night blindness and improving the user experience.

If the external lighting is darker than the HMD content that will be displayed to the user (operation 310), then the HMD content is initially presented with a dark modification (operation 312). This modified HMD content is displayed (operation 316) and then further modified over time to eventually display the HMD content in its original format (operation 318). This process allows the user's eyes to adjust to a light scene in the HMD content, allowing the user to avoid flash blindness and improving the user experience.

When the external lighting is similar or the same as the HMD content light, then no adjustment is used (operation 314), and the HMD content is displayed in its original format (operation 316). Modifications from the initial displayed HMD content is unused in this flow.

While FIGS. 2 and 3 refer to adjusting light levels in HMD content to transition a user from dark to light, or light to dark, environments, in other embodiments, sound levels may be adjusted in a similar manner many VR environments include a sound component to more fully envelope a user in a VR world. Depending on the implementation for such sound effects, the user may be unaware of the real-world sound characteristics. For instance, if the real-world is noisy and the VR world is relatively quiet, when ending a VR session the user may be jarred as they exit the quiet VR session and reemerge into the loud real-world environment. To ease the transition, the HMD may measure the real-world noise level and adjust the HMD content to acclimate the user to the real world noise level before ending the VR session. As an example, a user may be riding a commuter train and engage in a VR session. The VR session may simulate a quiet walk through a woodland area. As the VR ends, background noise may be slowly increased to bring the user out of the VR environment slowly.

Additionally, the HMD may control external lighting to further assist the transition from VR/AR content to real-world. For example, the external real-world lighting may be controlled by an environmental control, such as an electronic dimmer switch. The HMD may be coupled to the environmental control and adjust the external lighting to be closer to that in the VR or AR content. When the user removes the HMD, the reduced or increased lighting in the external real-world lighting may assist in the transition. After the user removes the HMD, the external lighting may be adjusted back to a previous setting. As an example, before the user removes their HMD, the external lighting may be at a maximum brightness for the room. Just before the user removes the HMD, the brightness may be reduced to 40% to match the VR content brightness level. After the user removes the HMD, the external real-world lighting may be increased gradually until it reaches 100% brightness again. External environmental controls may be used in combination with altering the brightness of VR or AR content.

Figure 4:
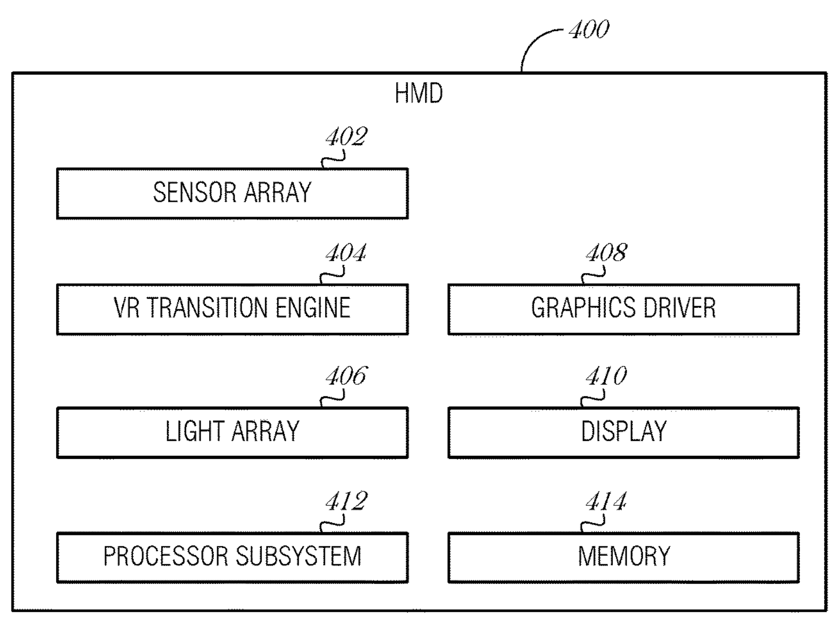
FIG. 4 is a block diagram illustrating an HMD that is capable of transitioning between VR and real-world environments, according to an embodiment.

FIG. 4 is a block diagram illustrating an HMD 400 that is capable of transitioning between VR and real-world environments, according to an embodiment. The HMD 400 includes a sensor array 402, a VR transition engine 404, a light array 406, a graphics driver 408, a display 410, a processor subsystem 412, and memory 414.

The HMD 400 is equipped with onboard systems that monitor the state of the HMD 400 and automatically adjust the display 410 provided by the HMD 400 based on the state. The HMD 400 may be equipped with one or more sensors (e.g., accelerometers, gyrometers, or magnetometers) to determine the state of the HMD 400 and optionally the state of the user.

The sensor array 402 may include various sensors such as cameras, light meters, microphones, or the like to monitor the environment around the user of the HMD 400. The sensor array 402 may include one or more cameras able to capture visible light, infrared, or the like, and may be used as 2D or 3D cameras (e.g., depth camera). The sensor array 402 may be configured to detect a gesture made by the user (wearer) and the processor subsystem 412 may use the gesture to trigger a transition process.

The HMD 400 may optionally include one or more inward facing sensors (not shown) to sense the user's face, skin, or eyes, and determine a relative motion between the HMD 400 and the detected face, skin, or eyes. The inward facing sensors may be mounted to an interior portion of the HMD 400, such as in the goggles housing, on the lens, or on a projecting portion of the HMD 400, in various embodiments. The relative motion of the user's head and eyes may be used to move the user's perspective in the VR environment. In addition, the relative motion may be used to move a brightened area in the VR world to track light sources in the real world, so as the user moves their head around, the brightened area is localized and tracks the position of the real-world light source.

The HMD 400 includes a display 410. An image or multiple images may be projected onto the display 410, such as is done by a microdisplay. Alternatively, some or all of the display 410 may be an active display (e.g., an organic light-emitting diode (OLED)) able to produce an image in front of the user. The display 410 also may be provided using retinal projection of various types of light, using a range of mechanisms, including (but not limited to) waveguides, scanning raster, color-separation and other mechanisms. In some examples, the display 410 is able to produce a high dynamic range to match real-world characteristics.

The VR transition engine 404 may be implemented in hardware, as hardware configured by software, or as a service provided by the processor subsystem 412. The VR transition engine 404 monitors the sensor array 402 to detect when the user initiates an exit from a VR session. The VR transition engine 404 may then interact with the graphics driver 408 to modify video frames that are output to the display 410. The modifications may be to brighten or darken the VR environment, or portions of the VR environment. Using the sensor array 402, the VR transition engine 404 may determine an approximate location of a light source in the real-world environment, and cause the graphics driver 408 to draw a brightened in the VR environment. The location of the light source may be stored so that as the user moves their head around in the VR world, the brightened area corresponding to the real-world light is localized and tracks the position of the real-world light source.

An optional light array 406 may be disposed on or around the HMD 400. For example, the light array 406 may include light-emitting diodes (LED) on the interior of the HMD 400 to illuminate a portion of the user's face, including the user's eyes, to help the user adjust to a brighter ambient light. Lights may be activated in coordination with the real-world light source. For example, if the user is facing forward and a ceiling light is shining down at her from a 45 degree angle left from straight ahead, and 60 degree angle from horizontal, lights in the upper left corner of the HMD 400 may be activated to simulate the room lighting. The intensity, color, and position may be reproduced to transition the user from the VR experience into the real-world experience. The light array 406 may be used alone or in combination with modifications to the HMD output being displayed on the display 410.

The memory 414 may include instructions to perform the various functions described herein, which when executed by the processor subsystem 412 may implement the functions. The memory 414 may also include user profiles to configure or control the transition. User profiles may define the length of the transition period, lighting preferences, sound preferences, triggering actions, etc.

Figure 5A:
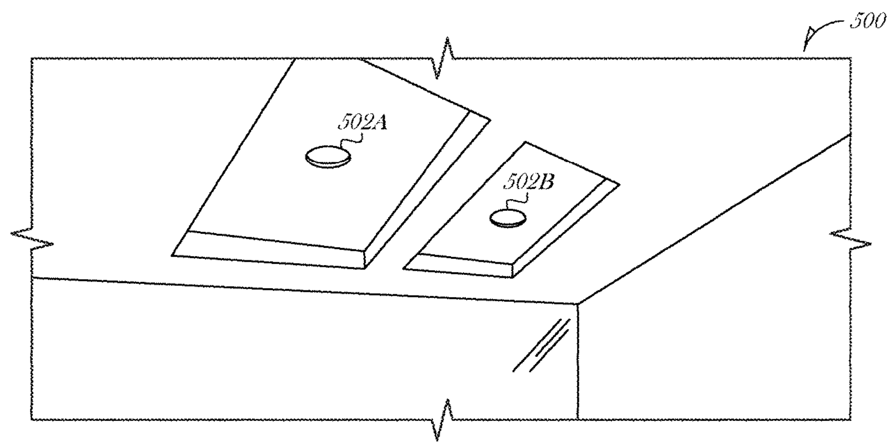
FIGS. 5A-C are schematic diagrams illustrating a transition from a VR environment to a real-world environment, according to an embodiment.
Figure 5B:
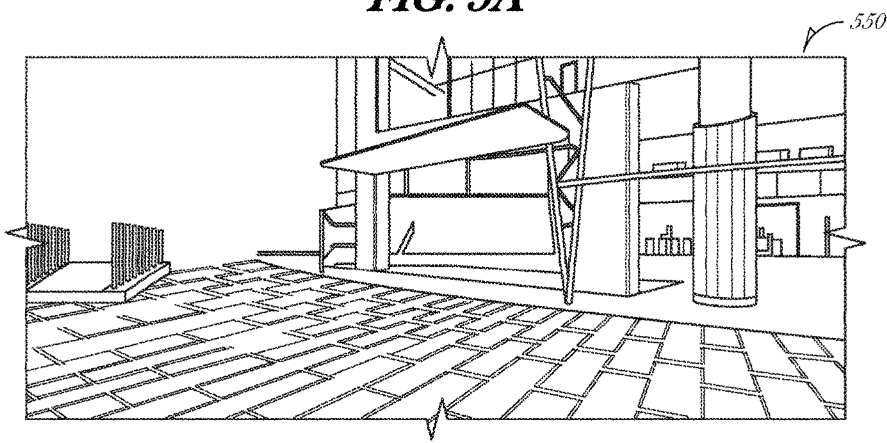
Figure 5C:
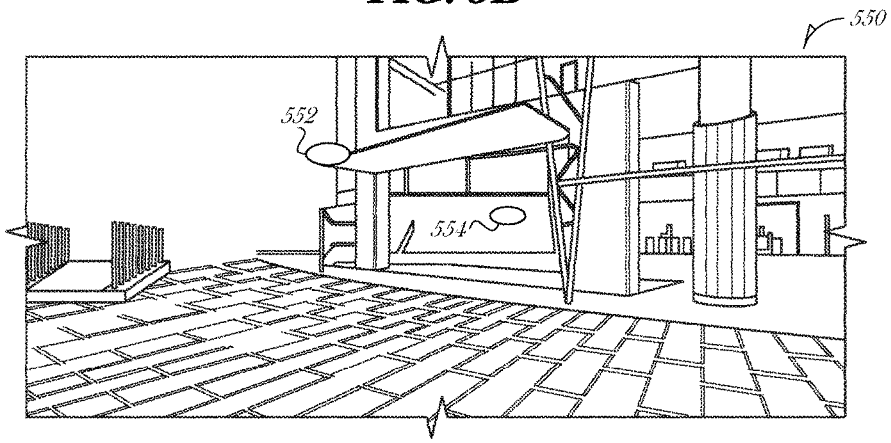

FIGS. 5A-C are schematic diagrams illustrating a transition from a VR environment to a real-world environment, according to an embodiment. FIG. 5A illustrates a real-world environment 500, such as a home office or some other space. The real-world environment includes two ceiling lights 502A, 502B (collectively referred to as 502). The ceiling lights 502 have a high intensity, localized area near the recess that houses the ceiling light 502 and more dispersed light around the rest of the environment 500.

FIG. 5B illustrates a VR environment 550 that the user is viewing while in the real-world environment 500. It is assumed that the user is facing the same direction as that depicted in FIG. 5A. However, while in the VR environment 550, all of the real-world lighting composition is obscured by the HMD. The VR environment 550 may be a night scene, such that the ambient light in the VR environment 550 may be low.

FIG. 5C illustrates a portion of the transition process where the ceiling lights 502 are represented as localized brightened areas 552, 554 in the VR environment 550. The bright areas 552, 554 may being as relatively dim highlights, and then over time increase in intensity, and optionally change color, to mimic the real-world lighting 502. The entire scene in the VR environment 550 may also be optionally brightened to more closely match the ambient lighting in the real-world environment 500.

Thus, returning to FIG. 4, the HMD 400 is a system for providing virtual reality transitions, that includes a VR transition engine 404 to detect a trigger event initiated by a user of the head-mounted display; a sensor array 402 to determine a real-world environmental condition; and a graphics driver 408 to present virtual reality content in a format based on the real-world environmental condition.

In an embodiment, to detect the trigger event, the VR transition engine 404 is to detect a voice command issued by the user. In a related embodiment, to detect the trigger event, the VR transition engine 404 is to detect a gesture made by the user. In a related embodiment, to detect the trigger event, the VR transition engine 404 is to detect a user interface interaction performed by the user. In a related embodiment, to detect the trigger event, the VR transition engine 404 is to detect a button press performed by the user.

To adjust the VR content appropriately, the HMD 400 monitors the environmental conditions (e.g., light, noise) around the user. Thus, in an embodiment, to determine the real-world environmental condition, the sensor array 402 is to access sensor data including luminance data describing an environment around the user. In a further embodiment, the luminance data is obtained from a camera array. The camera array may include one or more cameras able to detect visible light, infrared light, or the like.

In another embodiment, the luminance data is obtained from a light meter. Multiple light meters may be disposed around the crown of a user's head (e.g., on an HMD's headband or other support member). The light meters may provide some insight into directionality of stronger light sources and their position relative to the direction the user is facing. As the user turns toward a brighter light, the VR content may be adjusted with brighter portions to account of the brighter exterior environment.

In another embodiment, the luminance data is obtained from a luminosity sensor. A luminosity sensor is similar to a light meter. However, a luminosity sensor may have a wider range of detectible light (e.g., the full spectrum of visible light), more accurate readings, and be packaged in smaller form factors. For example, some luminosity sensors may detect as little as 188 microLux and as much as 88,000 Lux.

In another embodiment, to determine the real-world environmental condition, the sensor array 402 is to access sensor data including noise data describing an environment around the user. The noise data may obtained from a microphone coupled to the head-mounted display 410. Directionality of noise may be accounted for as well.

Based on the light level of the real-world environment, the VR content may be adjusted in different ways. If the light level is brighter in the real-world, then the VR content may be brightened to acclimate the user. Thus, in an embodiment, to present virtual reality content in the format based on the real-world environmental condition, the graphics driver 408 is to determine a location and an intensity of a real-world light source in an environment around the user and present a bright area in the virtual reality content in a position that corresponds with the location of the real-world light source. In a further embodiment, the graphics driver 408 is to adjust the bright area from a first brightness level to a second brightness level, the second brightness level closer to the intensity of the real-world light source than the first brightness level.

This adjustment may be performed over a period of time to allow the user to adjust gradually. The period may be a few seconds (e.g., 20 seconds) or longer. Because people adjust to bright light faster than they adjust to dark environments, less time is typically needed for a person to adjust to a well-lit area than the opposite. Thus, in an embodiment, to adjust the bright area, the graphics driver 408 is to adjust the bright area from the first brightness level to the second brightness level over a period.

In an embodiment, the VR transition engine 404 is to determine a color of the real-world light source, and the graphics driver 408 is to present the bright area using a color that is similar to the color of the real-world light source.

In some situations, such as where a user is in a bright environment and first puts on an HMD 400, the content in the HMD 400 may be too dark for the user to make out (e.g., eyes not adjusted for dim environment). As such, the HMD 400 may initially present the VR content in a brighter-than-usual format, and then over time reduce the brightness to arrive at the original format. As such, in an embodiment, the graphics driver is to gradually dim the virtual reality content over a period, the dimming causing initially brightened virtual reality content to be dimmed until the virtual reality content is displayed in a source format.

Turning to the opposite situation wherein the user is transitioned to a dark environment or is beginning a VR session in a dark environment, the brightness of VR content may be adjusted to transition the user from or to such an environment.

In an embodiment, to present virtual reality content in the format based on the real-world environmental condition, the graphics driver 408 is to determine a brightness level of an environment around the user and dim the virtual reality content closer to the brightness level of the real-world environment, when the brightness level of the real-world environment is less than a brightness level of the virtual reality content. This may occur as the user exits the VR content and may occur over a longer period of time. In an embodiment, to dim the virtual reality content, the graphics driver is to gradually dim the virtual reality content over a period. In a further embodiment, the period is at least five minutes.

The dimming of VR content may also occur when the user first puts on the HMD 400. So later, as the user is adjusting to the VR content, the brightness may be increased. In an embodiment, the graphics driver 408 is to gradually brighten the virtual reality content over a period, the brightening causing initially dimmed virtual reality content to be brightened to until the virtual reality content is displayed in a source format.

Ambient noise may also be accounted for as the user is transitioned from or to a VR environment. In an embodiment, to present virtual reality content in the format based on the real-world environmental condition, the VR transition engine 404 is to determine a noise level of an environment around the user and gradually increase a noise level of the virtual reality content to be closer to the noise level of the environment around the user, when the noise level of the real-world environment is greater than the noise level of the virtual reality content.

Figure 6:
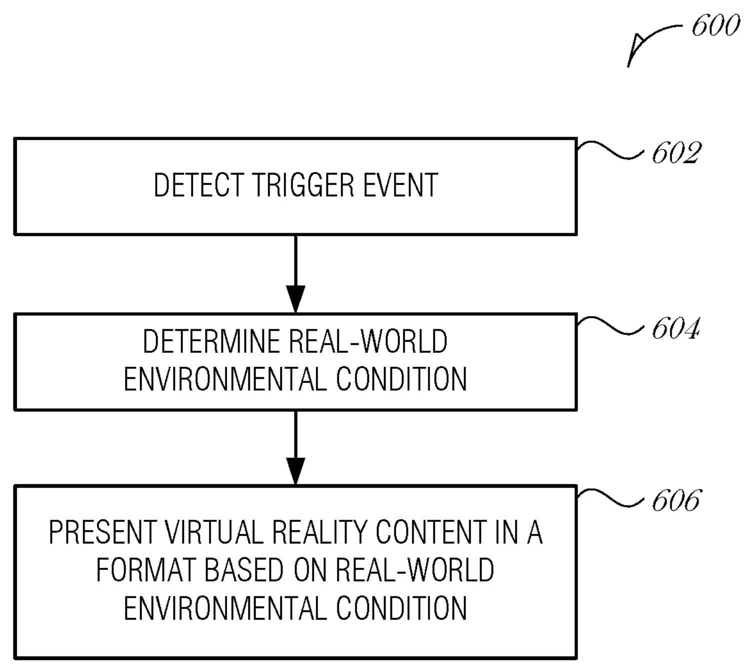
FIG. 6 is a flowchart illustrating a method for virtual reality transitions, according to an embodiment.

FIG. 6 is a flowchart illustrating a method 600 for virtual reality transitions, according to an embodiment. At 602, a trigger event initiated by a user of a head-mounted display, is detected at the head-mounted display. At 604, a real-world environmental condition is determined. At 606, virtual reality content is presented, by a head-mounted display, in a format based on the real-world environmental condition.

In an embodiment, detecting the trigger event comprises detecting a voice command issued by the user. In a related embodiment, detecting the trigger event comprises detecting a gesture made by the user. In a related embodiment, detecting the trigger event comprises detecting a user interface interaction performed by the user. In a related embodiment, detecting the trigger event comprises detecting a button press performed by the user. The button may be disposed on a housing of the head-mounted display.

In an embodiment, determining the real-world environmental condition comprises accessing sensor data including luminance data describing an environment around the user. In a further embodiment, the luminance data is obtained from a camera array. In a related embodiment, the luminance data is obtained from a light meter. In a related embodiment, the luminance data is obtained from a luminosity sensor.

In an embodiment, determining the real-world environmental condition comprises accessing sensor data including noise data describing an environment around the user. In a further embodiment, the noise data is obtained from a microphone coupled to the head-mounted display.

In an embodiment, presenting virtual reality content in the format based on the real-world environmental condition comprises determining a location and an intensity of a real-world light source in an environment around the user and presenting a bright area in the virtual reality content in a position that corresponds with the location of the real-world light source. In a further embodiment, the method 600 includes adjusting the bright area from a first brightness level to a second brightness level, the second brightness level closer to the intensity of the real-world light source than the first brightness level. In a further embodiment, adjusting the bright area comprises adjusting the bright area from the first brightness level to the second brightness level over a period.

In another embodiment, the method 600 includes determining a color of the real-world light source and presenting the bright area using a color that is similar to the color of the real-world light source.

In another embodiment, the method 600 includes gradually dimming the virtual reality content over a period, the dimming causing initially brightened virtual reality content to be dimmed until the virtual reality content is displayed in a source format. In this embodiment, after initially displaying the content near the room's light intensity, the VR content may be dimmed until it is in the source format (e.g., the lighting effects as originally designed by the producer of the VR content).

In an embodiment, presenting virtual reality content in the format based on the real-world environmental condition comprises determining a brightness level of an environment around the user and dimming the virtual reality content closer to the brightness level of the real-world environment, when the brightness level of the real-world environment is less than a brightness level of the virtual reality content. In a further embodiment, dimming the virtual reality content comprises gradually dimming the virtual reality content over a period. It typically takes longer for a person to adjust to dark environments after being in a brightly-lit environment. So the time period may be longer than a few seconds or minutes. In a further embodiment, the period is at least five minutes.

In some situations, the VR content is initially dimmed after the user begins a VR session. The dimmed content is used to provide an easier transition from a dim real-world environment to a VR environment. However, after some time, the user is transitioned to the fully-lit VR environment. As such, in an embodiment, the method 600 includes gradually brightening the virtual reality content over a period, the brightening causing initially dimmed virtual reality content to be brightened to until the virtual reality content is displayed in a source format.

In addition to display brightness, or in the alternative, the user may be provided a transition for noise levels. In an embodiment, presenting virtual reality content in the format based on the real-world environmental condition comprises determining a noise level of an environment around the user and gradually increasing a noise level of the virtual reality content to be closer to the noise level of the environment around the user, when the noise level of the real-world environment is greater than the noise level of the virtual reality content.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 7:
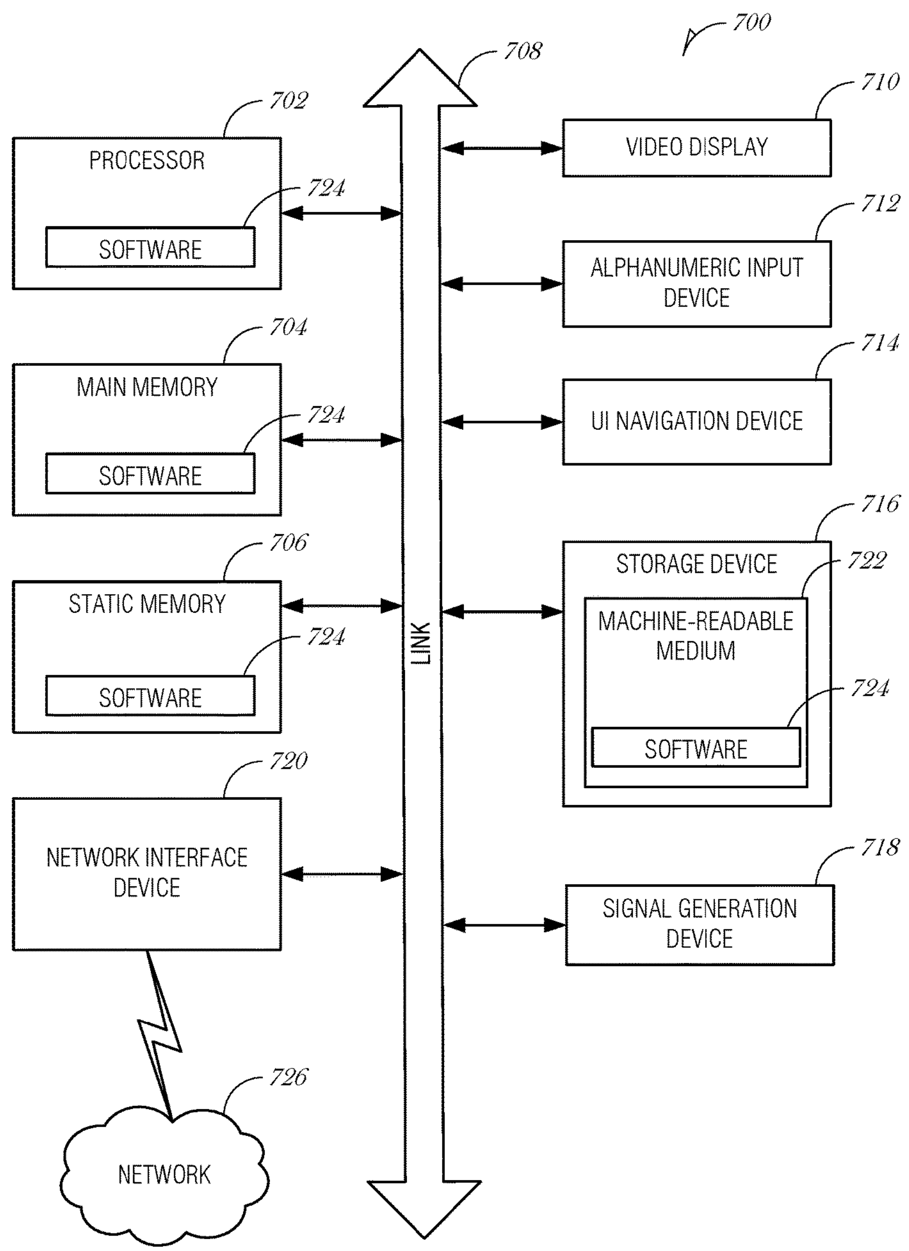
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a head-mounted display system for providing virtual reality transitions, the system comprising: a virtual reality transition engine to detect a trigger event initiated by a user of the head-mounted display; a sensor array to determine a real-world environmental condition; and a graphics driver to present virtual reality content in a format based on the real-world environmental condition.

In Example 2, the subject matter of Example 1 optionally includes wherein to detect the trigger event, the virtual reality transition engine is to detect a voice command issued by the user.

In Example 3, the subject matter of any one or more of Examples 1-2 optionally include wherein to detect the trigger event, the virtual reality transition engine is to detect a gesture made by the user.

In Example 4, the subject matter of any one or more of Examples 1-3 optionally include wherein to detect the trigger event, the virtual reality transition engine is to detect a user interface interaction performed by the user.

In Example 5, the subject matter of any one or more of Examples 1-4 optionally include wherein to detect the trigger event, the virtual reality transition engine is to detect a button press performed by the user.

In Example 6, the subject matter of any one or more of Examples 1-5 optionally include wherein to determine the real-world environmental condition, the sensor array is to access sensor data including luminance data describing an environment around the user.

In Example 7, the subject matter of Example 6 optionally includes wherein the luminance data is obtained from a camera array.

In Example 8, the subject matter of any one or more of Examples 6-7 optionally include wherein the luminance data is obtained from a light meter.

In Example 9, the subject matter of any one or more of Examples 6-8 optionally include wherein the luminance data is obtained from a luminosity sensor.

In Example 10, the subject matter of any one or more of Examples 1-9 optionally include wherein to determine the real-world environmental condition, the sensor array is to access sensor data including noise data describing an environment around the user.

In Example 11, the subject matter of Example 10 optionally includes wherein the noise data is obtained from a microphone coupled to the head-mounted display.

In Example 12, the subject matter of any one or more of Examples 1-11 optionally include wherein to present virtual reality content in the format based on the real-world environmental condition, the graphics driver is to: determine a location and an intensity of a real-world light source in an environment around the user; and present a bright area in the virtual reality content in a position that corresponds with the location of the real-world light source.

In Example 13, the subject matter of Example 12 optionally includes wherein the graphics driver is to adjust the bright area from a first brightness level to a second brightness level, the second brightness level closer to the intensity of the real-world light source than the first brightness level.

In Example 14, the subject matter of Example 13 optionally includes wherein to adjust the bright area, the graphics driver is to adjust the bright area from the first brightness level to the second brightness level over a period.

In Example 15, the subject matter of any one or more of Examples 12-14 optionally include wherein the VR transition engine is to determine a color of the real-world light source, and wherein the graphics driver is to present the bright area using a color that is similar to the color of the real-world light source.

In Example 16, the subject matter of any one or more of Examples 12-15 optionally include wherein the graphics driver is to gradually dim the virtual reality content over a period, the dimming causing initially brightened virtual reality content to be dimmed until the virtual reality content is displayed in a source format.

In Example 17, the subject matter of any one or more of Examples 1-16 optionally include wherein to present virtual reality content in the format based on the real-world environmental condition, the graphics driver is to: determine a brightness level of an environment around the user; and dim the virtual reality content closer to the brightness level of the real-world environment, when the brightness level of the real-world environment is less than a brightness level of the virtual reality content.

In Example 18, the subject matter of Example 17 optionally includes wherein to dim the virtual reality content, the graphics driver is to gradually dim the virtual reality content over a period.

In Example 19, the subject matter of Example 18 optionally includes wherein the period is at least five minutes.

In Example 20, the subject matter of any one or more of Examples 17-19 optionally include wherein the graphics driver is to gradually brighten the virtual reality content over a period, the brightening causing initially dimmed virtual reality content to be brightened to until the virtual reality content is displayed in a source format.

In Example 21, the subject matter of any one or more of Examples 1-20 optionally include wherein to present virtual reality content in the format based on the real-world environmental condition, the virtual reality transition engine is to: determine a noise level of an environment around the user; and gradually increase a noise level of the virtual reality content to be closer to the noise level of the environment around the user, when the noise level of the real-world environment is greater than the noise level of the virtual reality content.

Example 22 is a method of virtual reality transitions, the method comprising: detecting, at a head-mounted display, a trigger event initiated by a user of the head-mounted display; determining a real-world environmental condition; and presenting, by a head-mounted display, virtual reality content in a format based on the real-world environmental condition.

In Example 23, the subject matter of Example 22 optionally includes wherein detecting the trigger event comprises detecting a voice command issued by the user.

In Example 24, the subject matter of any one or more of Examples 22-23 optionally include wherein detecting the trigger event comprises detecting a gesture made by the user.

In Example 25, the subject matter of any one or more of Examples 22-24 optionally include wherein detecting the trigger event comprises detecting a user interface interaction performed by the user.

In Example 26, the subject matter of any one or more of Examples 22-25 optionally include wherein detecting the trigger event comprises detecting a button press performed by the user.

In Example 27, the subject matter of any one or more of Examples 22-26 optionally include wherein determining the real-world environmental condition comprises accessing sensor data including luminance data describing an environment around the user.

In Example 28, the subject matter of Example 27 optionally includes wherein the luminance data is obtained from a camera array.

In Example 29, the subject matter of any one or more of Examples 27-28 optionally include wherein the luminance data is obtained from a light meter.

In Example 30, the subject matter of any one or more of Examples 27-29 optionally include wherein the luminance data is obtained from a luminosity sensor.

In Example 31, the subject matter of any one or more of Examples 22-30 optionally include wherein determining the real-world environmental condition comprises accessing sensor data including noise data describing an environment around the user.

In Example 32, the subject matter of Example 31 optionally includes wherein the noise data is obtained from a microphone coupled to the head-mounted display.

In Example 33, the subject matter of any one or more of Examples 22-32 optionally include wherein presenting virtual reality content in the format based on the real-world environmental condition comprises: determining a location and an intensity of a real-world light source in an environment around the user; and presenting a bright area in the virtual reality content in a position that corresponds with the location of the real-world light source.

In Example 34, the subject matter of Example 33 optionally includes adjusting the bright area from a first brightness level to a second brightness level, the second brightness level closer to the intensity of the real-world light source than the first brightness level.

In Example 35, the subject matter of Example 34 optionally includes wherein adjusting the bright area comprises: adjusting the bright area from the first brightness level to the second brightness level over a period.

In Example 36, the subject matter of any one or more of Examples 33-35 optionally include determining a color of the real-world light source; and presenting the bright area using a color that is similar to the color of the real-world light source.

In Example 37, the subject matter of any one or more of Examples 33-36 optionally include gradually dimming the virtual reality content over a period, the dimming causing initially brightened virtual reality content to be dimmed until the virtual reality content is displayed in a source format.

In Example 38, the subject matter of any one or more of Examples 22-37 optionally include wherein presenting virtual reality content in the format based on the real-world environmental condition comprises: determining a brightness level of an environment around the user; and dimming the virtual reality content closer to the brightness level of the real-world environment, when the brightness level of the real-world environment is less than a brightness level of the virtual reality content.

In Example 39, the subject matter of Example 38 optionally includes wherein dimming the virtual reality content comprises: gradually dimming the virtual reality content over a period.

In Example 40, the subject matter of Example 39 optionally includes wherein the period is at least five minutes.

In Example 41, the subject matter of any one or more of Examples 38-40 optionally include gradually brightening the virtual reality content over a period, the brightening causing initially dimmed virtual reality content to be brightened to until the virtual reality content is displayed in a source format.

In Example 42, the subject matter of any one or more of Examples 22-41 optionally include wherein presenting virtual reality content in the format based on the real-world environmental condition comprises: determining a noise level of an environment around the user; and gradually increasing a noise level of the virtual reality content to be closer to the noise level of the environment around the user, when the noise level of the real-world environment is greater than the noise level of the virtual reality content.

Example 43 is at least one machine-readable medium including instructions, which when executed by a machine, cause the machine to perform operations of any of the methods of Examples 22-42.

Example 44 is an apparatus comprising means for performing any of the methods of Examples 22-42.

Example 45 is an apparatus for virtual reality transitions, the apparatus comprising: means for detecting, at a head-mounted display, a trigger event initiated by a user of the head-mounted display; means for determining a real-world environmental condition; and means for presenting, by a head-mounted display, virtual reality content in a format based on the real-world environmental condition.

In Example 46, the subject matter of Example 45 optionally includes wherein the means for detecting the trigger event comprise means for detecting a voice command issued by the user.

In Example 47, the subject matter of any one or more of Examples 45-46 optionally include wherein the means for detecting the trigger event comprise means for detecting a gesture made by the user.

In Example 48, the subject matter of any one or more of Examples 45-47 optionally include wherein the means for detecting the trigger event comprise means for detecting a user interface interaction performed by the user.

In Example 49, the subject matter of any one or more of Examples 45-48 optionally include wherein the means for detecting the trigger event comprise means for detecting a button press performed by the user.

In Example 50, the subject matter of any one or more of Examples 45-49 optionally include wherein the means for determining the real-world environmental condition comprise means for accessing sensor data including luminance data describing an environment around the user.

In Example 51, the subject matter of Example 50 optionally includes wherein the luminance data is obtained from a camera array.

In Example 52, the subject matter of any one or more of Examples 50-51 optionally include wherein the luminance data is obtained from a light meter.

In Example 53, the subject matter of any one or more of Examples 50-52 optionally include wherein the luminance data is obtained from a luminosity sensor.

In Example 54, the subject matter of any one or more of Examples 45-53 optionally include wherein the means for determining the real-world environmental condition comprise means for accessing sensor data including noise data describing an environment around the user.

In Example 55, the subject matter of Example 54 optionally includes wherein the noise data is obtained from a microphone coupled to the head-mounted display.

In Example 56, the subject matter of any one or more of Examples 45-55 optionally include wherein the means for presenting virtual reality content in the format based on the real-world environmental condition comprise: means for determining a location and an intensity of a real-world light source in an environment around the user; and means for presenting a bright area in the virtual reality content in a position that corresponds with the location of the real-world light source.

In Example 57, the subject matter of Example 56 optionally includes means for adjusting the bright area from a first brightness level to a second brightness level, the second brightness level closer to the intensity of the real-world light source than the first brightness level.

In Example 58, the subject matter of Example 57 optionally includes wherein the means for adjusting the bright area comprise: means for adjusting the bright area from the first brightness level to the second brightness level over a period.

In Example 59, the subject matter of any one or more of Examples 56-58 optionally include means for determining a color of the real-world light source; and means for presenting the bright area using a color that is similar to the color of the real-world light source.

In Example 60, the subject matter of any one or more of Examples 56-59 optionally include means for gradually dimming the virtual reality content over a period, the dimming causing initially brightened virtual reality content to be dimmed until the virtual reality content is displayed in a source format.

In Example 61, the subject matter of any one or more of Examples 45-60 optionally include wherein the means for presenting virtual reality content in the format based on the real-world environmental condition comprise: means for determining a brightness level of an environment around the user; and means for dimming the virtual reality content closer to the brightness level of the real-world environment, when the brightness level of the real-world environment is less than a brightness level of the virtual reality content.

In Example 62, the subject matter of Example 61 optionally includes wherein the means for dimming the virtual reality content comprises: means for gradually dimming the virtual reality content over a period.

In Example 63, the subject matter of Example 62 optionally includes wherein the period is at least five minutes.

In Example 64, the subject matter of any one or more of Examples 61-63 optionally include means for gradually brightening the virtual reality content over a period, the brightening causing initially dimmed virtual reality content to be brightened to until the virtual reality content is displayed in a source format.

In Example 65, the subject matter of any one or more of Examples 45-64 optionally include wherein the means for presenting virtual reality content in the format based on the real-world environmental condition comprise: means for determining a noise level of an environment around the user; and means for gradually increasing a noise level of the virtual reality content to be closer to the noise level of the environment around the user, when the noise level of the real-world environment is greater than the noise level of the virtual reality content.

Example 66 is at least one machine-readable medium including instructions for virtual reality transitions, which when executed by a machine, cause the machine to perform the operations comprising: detecting, at a head-mounted display, a trigger event initiated by a user of the head-mounted display; determining a real-world environmental condition; and presenting, by a head-mounted display, virtual reality content in a format based on the real-world environmental condition.

In Example 67, the subject matter of Example 66 optionally includes wherein detecting the trigger event comprises detecting a voice command issued by the user.

In Example 68, the subject matter of any one or more of Examples 66-67 optionally include wherein detecting the trigger event comprises detecting a gesture made by the user.

In Example 69, the subject matter of any one or more of Examples 66-68 optionally include wherein detecting the trigger event comprises detecting a user interface interaction performed by the user.

In Example 70, the subject matter of any one or more of Examples 66-69 optionally include wherein detecting the trigger event comprises detecting a button press performed by the user.

In Example 71, the subject matter of any one or more of Examples 66-70 optionally include wherein determining the real-world environmental condition comprises accessing sensor data including luminance data describing an environment around the user.

In Example 72, the subject matter of Example 71 optionally includes wherein the luminance data is obtained from a camera array.

In Example 73, the subject matter of any one or more of Examples 71-72 optionally include wherein the luminance data is obtained from a light meter.

In Example 74, the subject matter of any one or more of Examples 71-73 optionally include wherein the luminance data is obtained from a luminosity sensor.

In Example 75, the subject matter of any one or more of Examples 66-74 optionally include wherein determining the real-world environmental condition comprises accessing sensor data including noise data describing an environment around the user.

In Example 76, the subject matter of Example 75 optionally includes wherein the noise data is obtained from a microphone coupled to the head-mounted display.

In Example 77, the subject matter of any one or more of Examples 66-76 optionally include wherein presenting virtual reality content in the format based on the real-world environmental condition comprises: determining a location and an intensity of a real-world light source in an environment around the user; and presenting a bright area in the virtual reality content in a position that corresponds with the location of the real-world light source.

In Example 78, the subject matter of Example 77 optionally includes instructions to perform the operations comprising: adjusting the bright area from a first brightness level to a second brightness level, the second brightness level closer to the intensity of the real-world light source than the first brightness level.

In Example 79, the subject matter of Example 78 optionally includes wherein adjusting the bright area comprises: adjusting the bright area from the first brightness level to the second brightness level over a period.

In Example 80, the subject matter of any one or more of Examples 77-79 optionally include instructions to perform the operations comprising: determining a color of the real-world light source; and presenting the bright area using a color that is similar to the color of the real-world light source.

In Example 81, the subject matter of any one or more of Examples 77-80 optionally include instructions to perform the operations comprising: gradually dimming the virtual reality content over a period, the dimming causing initially brightened virtual reality content to be dimmed until the virtual reality content is displayed in a source format.

In Example 82, the subject matter of any one or more of Examples 66-81 optionally include wherein presenting virtual reality content in the format based on the real-world environmental condition comprises: determining a brightness level of an environment around the user; and dimming the virtual reality content closer to the brightness level of the real-world environment, when the brightness level of the real-world environment is less than a brightness level of the virtual reality content.

In Example 83, the subject matter of Example 82 optionally includes wherein dimming the virtual reality content comprises: gradually dimming the virtual reality content over a period.

In Example 84, the subject matter of Example 83 optionally includes wherein the period is at least five minutes.

In Example 85, the subject matter of any one or more of Example 82-84 optionally include instructions to perform the operations comprising: gradually brightening the virtual reality content over a period, the brightening causing initially dimmed virtual reality content to be brightened to until the virtual reality content is displayed in a source format.

In Example 86, the subject matter of any one or more of Example 66-85 optionally include wherein presenting virtual reality content in the format based on the real-world environmental condition comprises: determining a noise level of an environment around the user; and gradually increasing a noise level of the virtual reality content to be closer to the noise level of the environment around the user, when the noise level of the real-world environment is greater than the noise level of the virtual reality content.

Example 87 is a head-mounted display system for providing virtual reality transitions, the system comprising: a processor subsystem; and at least one machine-readable medium including instructions, which when executed by the processor subsystem, cause the processor subsystem to: detect a trigger event initiated by a user of the head-mounted display; determine a real-world environmental condition; and present virtual reality content in a format based on the real-world environmental condition.

In Example 88, the subject matter of Example 87 optionally includes wherein to detect the trigger event, the processor subsystem is to detect a voice command issued by the user.

In Example 89, the subject matter of any one or more of Example 87-88 optionally include wherein to detect the trigger event, the processor subsystem is to detect a gesture made by the user.

In Example 90, the subject matter of any one or more of Example 87-89 optionally include wherein to detect the trigger event, the processor subsystem is to detect a user interface interaction performed by the user.

In Example 91, the subject matter of any one or more of Example 87-90 optionally include wherein to detect the trigger event, the processor subsystem is to detect a button press performed by the user.

In Example 92, the subject matter of any one or more of Example 87-91 optionally include wherein to determine the real-world environmental condition, the processor subsystem is to access sensor data including luminance data describing an environment around the user.

In Example 93, the subject matter of Example 92 optionally includes wherein the luminance data is obtained from a camera array.

In Example 94, the subject matter of any one or more of Example 92-93 optionally include wherein the luminance data is obtained from a light meter.

In Example 95, the subject matter of any one or more of Example 92-94 optionally include wherein the luminance data is obtained from a luminosity sensor.

In Example 96, the subject matter of any one or more of Example 87-95 optionally include wherein to determine the real-world environmental condition, the processor subsystem is to access sensor data including noise data describing an environment around the user.

In Example 97, the subject matter of Example 96 optionally includes wherein the noise data is obtained from a microphone coupled to the head-mounted display.

In Example 98, the subject matter of any one or more of Example 87-97 optionally include wherein to present virtual reality content in the format based on the real-world environmental condition, the processor subsystem is to: determine a location and an intensity of a real-world light source in an environment around the user; and present a bright area in the virtual reality content in a position that corresponds with the location of the real-world light source.

In Example 99, the subject matter of Example 98 optionally includes wherein the processor subsystem is to adjust the bright area from a first brightness level to a second brightness level, the second brightness level closer to the intensity of the real-world light source than the first brightness level.

In Example 100, the subject matter of Example 99 optionally includes wherein to adjust the bright area, the processor subsystem is to adjust the bright area from the first brightness level to the second brightness level over a period.

In Example 101, the subject matter of any one or more of Examples 98-100 optionally include wherein the processor subsystem is to determine a color of the real-world light source, and present the bright area using a color that is similar to the color of the real-world light source.

In Example 102, the subject matter of any one or more of Examples 98-101 optionally include wherein the processor subsystem is to gradually dim the virtual reality content over a period, the dimming causing initially brightened virtual reality content to be dimmed until the virtual reality content is displayed in a source format.

In Example 103, the subject matter of any one or more of Examples 87-102 optionally include wherein to present virtual reality content in the format based on the real-world environmental condition, the processor subsystem is to: determine a brightness level of an environment around the user; and dim the virtual reality content closer to the brightness level of the real-world environment, when the brightness level of the real-world environment is less than a brightness level of the virtual reality content.

In Example 104, the subject matter of Example 103 optionally includes wherein to dim the virtual reality content, the processor subsystem is to gradually dim the virtual reality content over a period.

In Example 105, the subject matter of Example 104 optionally includes wherein the period is at least five minutes.

In Example 106, the subject matter of any one or more of Examples 103-105 optionally include wherein the processor subsystem is to gradually brighten the virtual reality content over a period, the brightening causing initially dimmed virtual reality content to be brightened to until the virtual reality content is displayed in a source format.

In Example 107, the subject matter of any one or more of Examples 87-106 optionally include wherein to present virtual reality content in the format based on the real-world environmental condition, the processor subsystem is to: determine a noise level of an environment around the user; and gradually increase a noise level of the virtual reality content to be closer to the noise level of the environment around the user, when the noise level of the real-world environment is greater than the noise level of the virtual reality content.

Example 108 is at least one machine-readable medium including instructions, which when executed by a machine, cause the machine to perform operations of any of the operations of Example 1-107.

Example 109 is an apparatus comprising means for performing any of the operations of Example 1-107.

Example 110 is a system to perform the operations of any of the Example 1-107.

Example 111 is a method to perform the operations of any of the Examples 1-107.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A head-mounted display system for providing virtual reality transitions, the system comprising:

a virtual reality transition engine, implemented in processing circuitry, to detect a trigger event initiated by a user of the head-mounted display system, the trigger event indicating an intent to exit a virtual reality session and remove the head-mounted display system;

a sensor array to determine a real-world environmental condition; and a graphics driver to present virtual reality content in a format based on the real-world environmental condition, wherein to present virtual reality content in the format based on the real-world environmental condition, the graphics driver is to:

determine a location and an intensity of a real-world light source in an environment around the user;

present a bright area overlaying the virtual reality content in a position that corresponds with the location of the real-world light source; and adjust the bright area from a first brightness level to a second brightness level in response to the trigger event, the second brightness level brighter than the first brightness level and the second brightness level closer to the intensity of the real-world light source than the first brightness level.

2. The system of claim 1, wherein to determine the real-world environmental condition, the sensor array is to access sensor data including luminance data describing an environment around the user.

3. The system of claim 2, wherein the luminance data is obtained from a cat era array.

4. The system of claim 1, wherein to adjust the bright area, the graphics driver is to adjust the bright area from the first brightness level to the second brightness level over a period.

5. The system of claim 1, wherein the virtual reality transition engine is to determine a color of the real-world light source, and wherein the graphics driver is to present the bright area using a color that is similar to the color of the real-world light source.

6. The system of claim 1, wherein the graphics driver is to gradually dim the virtual reality content over a period, the dimming causing initially brightened virtual reality content to be dimmed until the virtual reality content is displayed in a source format.

7. The system of claim 1, wherein to present virtual reality content in the format based on the real-world environmental condition, the graphics driver is to:

determine a brightness level of an environment around the user; and dim the virtual reality content closer to the brightness level of the real-world environment, when the brightness level of the real-world environment is less than a brightness level of the virtual reality content.

8. A method for virtual reality transitions, which when executed by a machine, cause the machine to perform the operations comprising:

detecting, at a head-mounted display, a trigger event initiated by a user of the head-mounted display, the trigger event indicating an intent to exit a virtual reality session and remove the head-mounted display;

determining a real-world environmental condition; and presenting, by the head-mounted display, virtual reality content in a format based on the real-world environmental condition, wherein presenting virtual reality content in the format based on the real-world environmental condition comprises:

determining a location and an intensity of a real-world light source in an environment around the user;

presenting a bright area overlaying the virtual reality content in a position that corresponds with the location of the real-world light source; and adjusting the bright area from a first brightness level to a second brightness level in response to the trigger event, the second brightness level brighter than the first brightness level and the second brightness level closer to the intensity of the real-world light source than the first brightness level.

9. At least one non-transitory machine-readable medium of virtual reality transitions, the at least one machine-readable medium comprising:

detecting, at a head-mounted display, a trigger event initiated by a user of the head-mounted display, the trigger event indicating an intent to exit a virtual reality session and remove the head-mounted display;

determining a real-world environmental condition; and presenting, by the head-mounted display, virtual reality content in a format based on the real-world environmental condition, wherein presenting virtual reality content in the format based on the real-world environmental condition comprises:

determining a location and an intensity of a real-world light source in an environment around the user;

presenting a bright area overlaying the virtual reality content in a position that corresponds with the location of the real-world light source; and adjusting the bright area from a first brightness level to a second brightness level in response to the trigger event, the second brightness level brighter than the first brightness level and the second brightness level closer to the intensity of the real-world light source than the first brightness level.

10. The at least one non-transitory machine-readable medium of claim 9, wherein determining the real-world environmental condition comprises accessing sensor data including luminance data describing an environment around the user.

11. The at least one non-transitory machine-readable medium of claim 9, wherein adjusting the bright area comprises: adjusting the bright area from the first brightness level to the second brightness level over a period.

12. The at least one non-transitory machine-readable medium of claim 9, further comprising instructions to perform the operations comprising:

determining a color of the real-world light source; and presenting the bright area using a color that is similar to the color of the real-world light source.

13. The at least one non-transitory machine-readable medium of claim 9, further comprising instructions to perform the operations comprising gradually dimming the virtual reality content over a period, the dimming causing initially brightened virtual reality content to be dimmed until the virtual reality content is displayed in a source format.

14. The at least one non-transitory machine-readable medium of claim 9, wherein presenting virtual reality content in the format based on the real-world environmental condition comprises:

determining a brightness level of an environment around the user; and dimming the virtual reality content closer to the brightness level of the real-world environment, when the brightness level of the real-world environment is less than a brightness level of the virtual reality content.

15. The at least one non-transitory machine-readable medium of claim 14, wherein dimming the virtual reality content comprises: gradually dimming the virtual reality content over a period.

16. The at least one non-transitory machine-readable medium of claim 15, wherein the period is at least five minutes.

17. The at least one non-transitory machine-readable medium of claim 14, further comprising:

gradually brightening the virtual reality content over a period, the brightening causing initially dimmed virtual reality content to be brightened to until the virtual reality content is displayed in a source format.

* * * * *

UNITED STATES PATENT AND TRADEMARK OFFICE

CERTIFICATE OF CORRECTION

PATENT NO. : 10,475,243 B2
APPLICATION NO. : 15/475722
DATED : November 12, 2019
INVENTOR(S) : Marshall et al.

It is certified that error appears in the above-identified patent and that said Letters Patent is hereby corrected as shown below:

In the Claims

In Column 23, Line 23, in Claim 3, delete "cat era" and insert --camera-- therefor Signed and Sealed this
Twenty-fourth Day of November, 2020

Andrei Iancu
*Director of the United States Patent and Trademark Office*